(12) United States Patent
Huang et al.

(10) Patent No.: US 7,131,771 B2
(45) Date of Patent: Nov. 7, 2006

(54) AUTOMATIC OPTIMIZATION OF A SPLICE LOSS ESTIMATOR FOR OPTICAL FIBER SPLICERS

(75) Inventors: Wei-Ping Huang, Spanga (SE); Tomas Adeback, Jarfalla (SE); Wenxin Zheng, Ellicott City, MD (US); Lars Wiik, Nacka (SE)

(73) Assignee: Telefonaktiebolaget LM ERicsson (publ), Stockholm (SE)

( * ) Notice: Subject to any disclaimer, the term of this patent is extended or adjusted under 35 U.S.C. 154(b) by 201 days.

(21) Appl. No.: 10/473,766

(22) PCT Filed: Apr. 4, 2002

(86) PCT No.: PCT/SE02/00668

§ 371 (c)(1),
(2), (4) Date: Dec. 1, 2004

(87) PCT Pub. No.: WO02/082137

PCT Pub. Date: Oct. 17, 2002

(65) Prior Publication Data

US 2005/0078921 A1    Apr. 14, 2005

(30) Foreign Application Priority Data

Apr. 6, 2001    (SE) .................... 0101236

(51) Int. Cl.
*G02B 6/255*    (2006.01)
*G05B 13/00*    (2006.01)
(52) U.S. Cl. .................... 385/95; 700/44; 702/181
(58) Field of Classification Search ............ 385/95–99; 700/44–45; 702/181
See application file for complete search history.

(56) References Cited

U.S. PATENT DOCUMENTS 4,978,201 A * 12/1990 Yamada et al. ............... 385/96
5,259,047 A * 11/1993 Morrison et al. ............. 385/27
6,676,307 B1 * 1/2004 Yang et al. .................... 385/96

OTHER PUBLICATIONS

Haibara et al, "Monitoring Method For Axis Alignment Of Single-Mode Optical Fiber And Splice-Loss Estimation", Optics Letters, vol. 8, No. 4, Apr. 1983, pp. 235-237.*
Zheng et al, "Erbium-Doped Fiber Splicing And Splice Loss Estimation", IEEE Journal of Lightwave Technology, vol. 12, No. 3, Mar. 1994, pp. 430-435.*

* cited by examiner

*Primary Examiner*—John D. Lee

(57) ABSTRACT

A technique is provided for automatic optimization of a splice loss estimator of a fiber splicer (1), where the splice loss estimator is adapted, in a splice loss estimation procedure, to estimate the splice losses ($L_{ti}$) of splices (i) of optical fibers as produced by the fiber splicer from images taken of the optical fibers at the splicing thereof, and the splice loss estimation procedure includes the use of splice loss estimation parameters ($P_j$). The estimator estimates splice losses based on information ($C_{ij}$) obtained from the images and the estimation parameters. Further, the splice losses are measured by means of a measurement instrument (3). The estimated ($L_{ti}$) and measured ($L_{Mi}$) splice losses, and the information obtained from the images are uploaded (71) into an off-line computer (5) and the key estimation parameters are automatically optimized by the selection of any solution within the Bellcore accuracy criteria (75), whereafter the optimized estimation parameters are downloaded (81) to the splicer.

21 Claims, 5 Drawing Sheets

AUTOMATIC OPTIMIZATION OF A SPLICE LOSS ESTIMATOR FOR OPTICAL FIBER SPLICERS

TECHNICAL FIELD OF THE INVENTION

The present invention generally relates to fiber optics. More specifically, the invention relates to an apparatus and a method, respectively, for automatic optimization of a splice loss estimator for optical fiber splicers, to an optical fiber splicer system comprising such an apparatus, and to a computer program product for performing such a method.

DESCRIPTION OF RELATED ART AND BACKGROUND OF THE INVENTION

The technology for forming low-loss optical fibers has advanced to a point where there is widespread commercial manufacturing of optical fibers. Most processing includes drawing an optical fiber from a previously manufactured glass boule, sometimes referred to as a fiber preform. Extremely long lengths of fiber can be obtained by splicing a plurality of lengths, which are obtained using current fusion splicer techniques. Additionally, it has become increasingly more common to splice optical fibers, which have broken, either accidentally, or during appropriate proof testing. For these and other applications, splicing in which the coating material is removed from end portions of two fibers, which are then fused together end to end, provides a suitable means for joining the ends of two glass fibers with an acceptably low splice loss.

Fusion splice losses depend mainly on the mismatch of mode-field diameter (MFD) and misalignment of the cladding/core of two fibers due to either the fiber refractive index design or the inappropriate fusion processes being used. With the help of image techniques, information on the MFD mismatch can be obtained and analyzed by monitoring the deformation/misalignment of the cladding/core of the fibers during the fusion process, see e.g. EP 1 014 070. Such a monitoring system includes typically a charged-coupled device (CCD) camera equipped with an image processor. By use of suitable theoretical models and the information obtained from the images, an estimation method for evaluation of splice losses can be established.

The estimation method as a passive technique for evaluation of splice losses is widely used in most automated fusion splicers of today. Different models for evaluation of splice loss have been explored and developed during the past two decades. Well-known methods for splice loss estimation include the butt-joint approximation and the mode coupling theory. More advanced methods, e.g. hot-image techniques for real-time analysis of cladding and core deformation have also been developed.

In order to achieve the best performance and maximize the flexibility of the estimation method, the models used for splice loss estimation include usually a number of free parameters, called estimation parameters. The optimization of these estimation parameters in order to achieve the best performance of the estimation method has nowadays become one of essential features in the development of splicing techniques. In practice, the estimation parameters are manually optimized according to different types of on-test fibers and the fusion processes being used.

Due to primarily technical reasons and rather complicated nature of the involved splicing processes, the optimization of the estimation parameters is a quite difficult and time consuming job that may only be performed by very experienced engineers.

The time typically needed for manually optimizing the estimation parameters on a given fiber combination is as long as a few days which is hardly to be accepted by splicer users, especially, when frequently changes of fusion processes and fiber combinations are involved, e.g. in the manufacture of erbium doped fiber amplifiers (EDFA). This is hardly acceptable for the splicer user, and such optimization has thus typically to be performed by the fiber splicer manufacturer.

SUMMARY OF THE INVENTION

The present inventors have realized that the splicer user does not need to re-optimize the image processing parameters, but only the estimation parameters. For a fiber splicer user, only a limited number of the image processing parameters can be optimized, and most of these parameters are already designed to be linear to the splice loss by an embedded algorithm in the splicer.

In the present invention a new technique for fast automatic optimization of the performance of the estimator is proposed. The technique leaves the image processing of the cold and hot images taken during the fusion processes unchanged.

The built-in estimator in the splicer analyzes the causes of splice losses based on the information obtained from the images, and based on the fusion process employed and the kind of spliced fibers. Further, splice losses are measured by means of a measurement instrument, e.g. a power meter. The results of the analysis and the measured splice losses are uploaded into a spreadsheet-based worksheet in an off-line computer and/or a PC-platform based splicer to form a splice database. Then, the manual procedures for optimization of estimation parameters are simulated.

The key estimation parameters are automatically optimized by the selection of any solution within the Bellcore accuracy criteria, or the best solution within the Bellcore accuracy criteria by assistance of regression analysis criteria, whereafter the optimized estimation parameters are downloaded to splicer.

The time needed for optimizing a splice database with hundred splices is significantly reduced down to a few seconds only. Thus, an enhanced performance of the estimator is automatically achieved. The tedious and complicated work for manually optimizing the estimator is automated.

It is a main object of the present invention to provide an apparatus for automatic optimization of a splice loss estimator of an optical fiber splicer, wherein the splice loss estimator is adapted, in a splice loss estimation procedure, to estimate the splice losses of splices of end portions of optical fibers as produced by said fiber splicer apparatus from at least one respective image taken of the respective end portions of the optical fibers prior to, during, or subsequent to the splicing thereof, and wherein the splice loss estimation procedure includes the use of a set of splice loss estimation parameters, which apparatus for automatic optimization is fast, and which is particularly suited to be used by a fiber splicer user.

It is in this respect a particular object of the invention to provide such apparatus, which is simple, easy to use, accurate, precise and of low cost.

These objects, among others, are according to a first aspect of the present invention attained by an apparatus comprising a first input line; a second input line; means for determining (preferably a personal computer provided with suitable software); and an output line.

The first input line is provided for receiving, from the splice loss estimator, data of a plurality of splices of end portions of optical fibers as produced by the fiber splicer apparatus, wherein the data for each splice include information derived from the image taken of the end portions of the optical fibers constituting that splice, and the estimated splice loss of that splice; and the second input line is provided for receiving a splice loss value for each of the plurality of splices of end portions of optical fibers as measured by a measurement equipment.

The means for determining is adapted to determine or calculate a new set of splice loss estimation parameters from the data and the measured splice loss values such that the splice loss estimation procedure, using the new set of splice loss estimation parameters, estimates the splice loss of each of the plurality of splices of end portions of optical fibers with a given accuracy.

Finally, the output line is provided for outputting the determined or calculated new set of splice loss estimation parameters to the splice loss estimator of the fiber splicer apparatus to replace the set of splice loss estimation parameters used in the splice loss estimation procedure of the splice loss estimator for the estimation of the splice losses of any further splices of end portions of optical fibers to be produced by the fiber splicer apparatus.

Further, the above-mentioned objects, among others, are according to a second aspect of the present invention attained by an optical fiber splicer system comprising such an apparatus for automatic optimization.

It is a further object of the present invention to provide a method for automatic optimization of the above-depicted splice loss estimator, which is fast and which is thus suitable to be used by the fiber splicer user.

This object is according to a third aspect of the present invention attained by a method comprising the following steps:

(i) receiving, from said splice loss estimator, data of a plurality of splices of end portions of optical fibers as produced by said fiber splicer apparatus, wherein said data for each splice include information derived from the at least one image taken of the end portions of the optical fibers constituting that splice, and the estimated splice loss of that splice;

(ii) receiving a splice loss value for each of said plurality of splices of end portions of optical fibers as measured by a measurement equipment;

(iii) determining a new set of splice loss estimation parameters from said data and said measured splice loss values such that said splice loss estimation procedure, using the new set of splice loss estimation parameters, estimates the splice loss of each of said plurality of splices of end portions of optical fibers with a given accuracy; and (iv) outputting said determined new set of splice loss estimation parameters to said splice loss estimator to replace the set of splice loss estimation parameters used in the splice loss estimation procedure of the splice loss estimator for the estimation of the splice losses of any further splices of end portions of optical fibers to be produced by said fiber splicer apparatus.

Finally, according to a fourth aspect of the present invention there is provided a computer program product loadable into the internal memory of a computer, which comprises software code portions for performing the above-described method when the computer program product is run on the computer.

Further characteristics of the invention and advantages thereof will be evident from the detailed description of preferred embodiments of the invention given hereinbelow and the accompanying drawings, which are given by way of illustration only, and thus are not limitative of the present invention.

DETAILED DESCRIPTION OF EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details.

Figure 1:
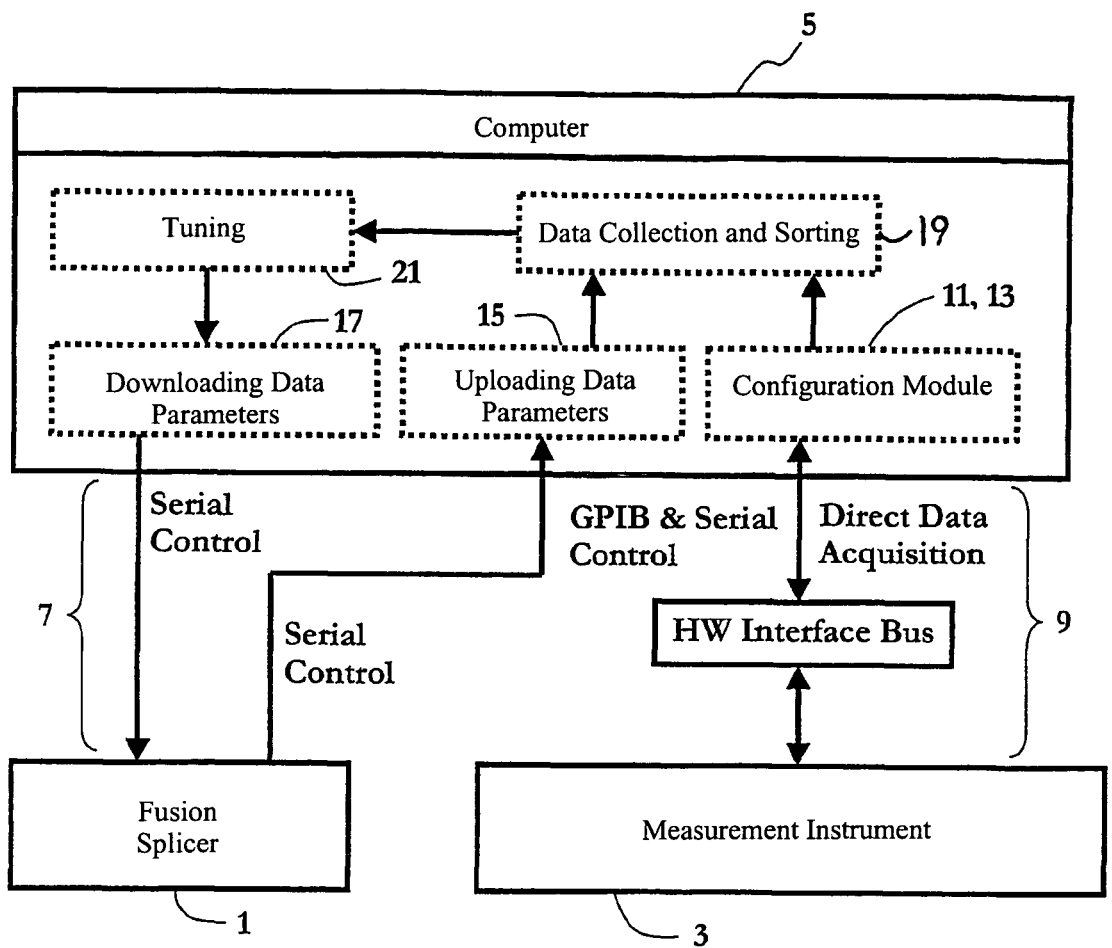
FIG. 1 illustrates, schematically, in a block diagram, an optical fiber splicer system comprising an optical fiber fusion splicer, measurement instruments, and an apparatus for automatic off-line optimization of a splice loss estimator for the optical fiber fusion splicer according to a general embodiment of the present invention.

Optical Fiber Splicer System Including a PC-based Platform for Supporting Off-line Tuning With reference to FIG. 1, which schematically illustrates an optical fiber splicer system, a general embodiment of the present invention will be overviewed.

The system comprises an optical fiber fusion splicer 1 including a splice loss estimator (not explicitly illustrated in FIG. 1) for, in a splice loss estimation procedure, estimating the splice losses of splices of end portions of optical fibers as produced by the fiber splicer 1 from at least one respective image taken of the respective end portions of the optical fibers prior to, during, or subsequent to the splicing thereof, where the splice loss estimation procedure includes the use of a set of splice loss estimation parameters. The optical fiber fusion splicer may e.g. be an Ericsson 995 Fusion Splicer.

Further, there is provided measurement equipment 3 for measuring the splice loss for a number of splices produced. The measurement equipment may be a power meter, an extinction ratio meter, or similar.

Both the optical fiber fusion splicer 1 and the measurement equipment 3 are connected to an apparatus 5 for automatic off-line optimization of the splice loss estimator of the optical fiber fusion splicer 1 by means of respective connection lines 7, 9. The apparatus 5 is typically a computer.

The splicer system is typically implemented as an off-line PC and/or a PC-platform based splicer. The platform provides the reliable communication among the computer, the splicer and the measurement instruments. It supports the fast data/parameters transition and automatic parameter optimization, and it also opens the possibility for development of application programs like off-line tuning.

In order to make an automatic optimization of the splice loss estimator a splice database is established in the apparatus 5, where the splice database includes results obtained by the estimator from a number of splices (i.e. estimated splice losses and information derived from the at least one image taken of the respective splice), the estimation parameters used in the splice loss estimation procedures, as well as the corresponding measured splice losses.

A spreadsheet-based software, e.g. Microsoft® Excel, is one of the most commonly used commercial software packages for spreadsheet applications (e.g. data collection, sorting and analysis etc.). In the present invention, Microsoft® Excel is used as a basic software platform to form most application software modules for off-line tuning (see FIG. 1). These modules include a module 11 for configuration of measurement instruments, modules 13, 15, 17 for uploading and downloading data/parameters, a module 19 for data collection and sorting, and a module 21 for off-line tuning. The arrows in FIG. 1 show the paths of data flow.

Image-derived Information Data and Estimation Parameters

The splice loss database for off-line tuning is established based essentially on two major parts: (1) data of the measured splice losses obtained from measurement instruments, i.e. measured splice losses; and (2) information data derived from the at least one image taken of the respective splice, and estimation parameters obtained from the estimator.

Uploading the data of the measured splice losses is straightforward. The data of splice losses obtained from measurement instrument 3 (e.g. a Hewlett Packard 8153A Lightwave Multimeter) for each splice can be directly uploaded into the Excel worksheet using standard communication methods, e.g. by means of a general purpose interface bus (GPIB), serial communication or direct data acquisition as shown in FIG. 1. On the other hand, however, the image-derived information data and the estimation parameters obtained from the estimator have to be carefully selected since the models for splice loss estimation depends on the fusion processes and the fiber types being used.

For clarity, the procedures for construction of the splice database and for optimization of the splice loss estimator of an Ericsson FSU995 Fusion Splicer are described below as an illustrative example.

Figure 2:
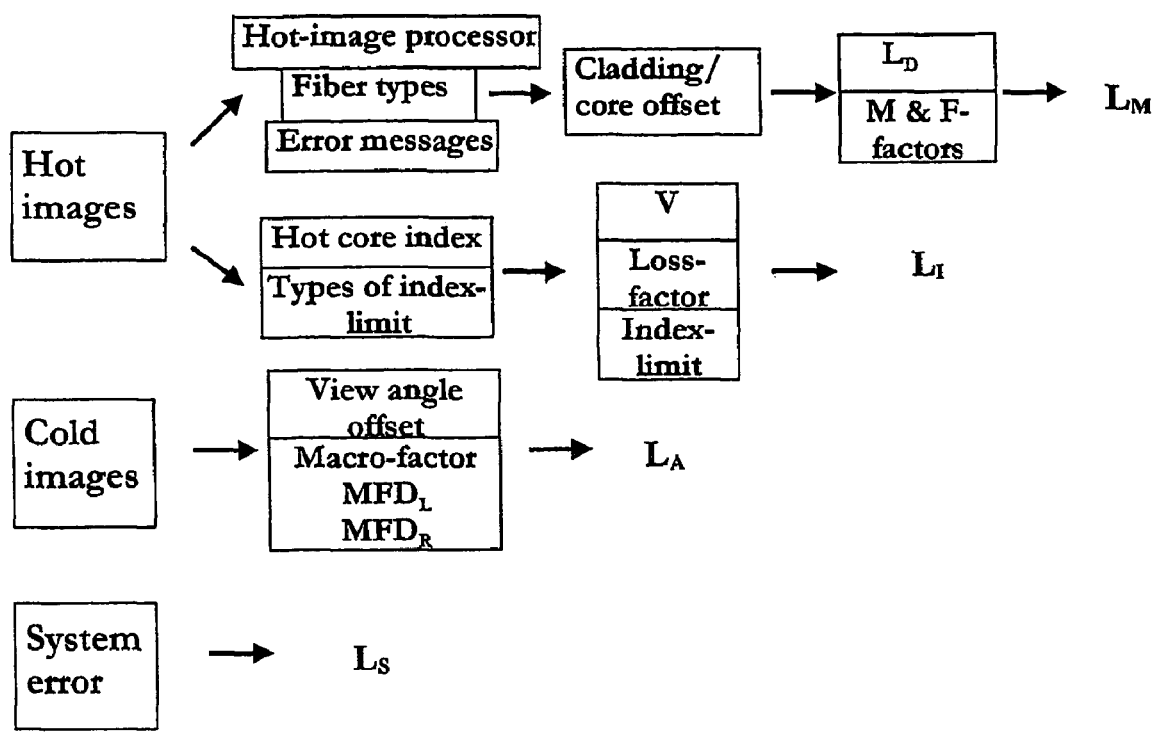
FIG. 2 illustrates schematically procedures for deriving splice losses.

The causes of splice losses in the Ericsson FSU995 splicer have been classified into four portions according to different loss mechanisms, see FIG. 2.

Splice loss $L_M$ due to core deformation (the micro bending loss $L_D$ when the MFD mismatch is taken into account). This loss is mainly caused by bad fiber quality (e.g. high cladding to core eccentricity, high non-circularity of the fiber etc.), by bad cleave angles, by high cladding offset after alignment, and by inappropriate selection of fusion processes and/or fusion parameters.

Splice loss $L_I$ due to mismatch of hot core index. This loss originates from directional diffusion processes caused by significant difference of the dopant concentrations in the fibers, and significant difference in the development of fiber core deformation due to different fiber core diameters.

Splice loss $L_A$ due to macro bending. This loss is mainly caused by imperfect longitude alignment of the fibers because of an inappropriate force applied on the stripped surfaces of the fibers, and microdust of large size remaining on the fiber surfaces.

Splice loss shift $L_S$. This loss is caused by the systematic errors due to systematic errors in the measurement system and imperfections of mechanical system in the splicer. It usually presents as a constant shift in the splice losses.

The total splice loss $L_T$ can then be expressed by summation of the losses from the different mechanisms:

$$L_T = L_M + L_I + L_A + L_S \quad (1)$$

These losses can be expressed as functions of the estimation parameters and the analyzed results (i.e. image-originating parameters) derived by the estimator.

$$\text{i } L_M = L_M \{L_D, F \text{ factor}(MFD_L, MFD_R), M \text{ factor} (MFD_L, MFD_R)\} \quad (2)$$

$$L_I = L_I \{V, \text{loss factor, Index limit}\} \quad (3)$$

$$L_A = L_A \{\text{view angle offset, macro factor, } MFD_L, MFD_R\} \quad (4)$$

Here, the analyzed results (image-derived parameters) used in the estimation are the micro bending loss $L_D$ and the hot core index offset V obtained from hot images, and the view angle offset (i.e. the view angle difference between left and right fibers) obtained from cold images.

The estimation parameters are the M and F factors (which are uniquely determined by means of the $MFD_L$ and $MFD_R$), the loss factor, the index limit, the macro factor for adjustment of $L_A$, the $MFD_L$ and $MFD_R$ representing MFD of left and right fibers, as well as $L_S$.

The loss factor and the index limit are parameters designed for erbium fiber splicing processes only.

The basic procedures how to derive the total loss from primary information of the images and the estimation parameters is schematically illustrated in the FIG. 2.

Off-line Tuning Procedures

For a sequence of n splices, a splice database for the off-line tuning can be created by use of the upload software modules. Assuming that the measured splice loss for the i'th splice is $L_{Mi} \in \{L_{M1}, L_{M2}, \ldots L_{Mn}\}$, i=1, 2, \ldots n, and the estimated splice loss corresponding to the i'th splice is $L_{Ti} \in \{L_{T1}, L_{T2}, \ldots L_{Tn}\}$, the splice database will thus be:

$$\text{Database} = \{L_{Mi}, L_{Ti}(P_j, C_{ik})\},$$

$$i=1, 2, \ldots n; j=1, 2, \ldots; k=1, 2, \ldots \quad (5)$$

where, $P_j$ and $C_{ik}$ are the estimation parameters and the analyzed results obtained from the estimator, respectively.

Note particularly that $L_{Mi}$ is the measured loss for splice i and shall not be mixed up with the splice loss $L_M$ due to core deformation.

Further, the estimation parameters $P_j$, j=1, 2, \ldots, are different for different fusion processes used and for different kind of fibers spliced.

After uploading all data into the worksheet, it is important to sort the data according to fusion processes being used. There are two reasons for data sort.

(1) Some parameters have been designed not only for optimizing the estimator but also for controlling the fusion processes. These parameters should not be optimized during the off-line tuning if they have been used as control parameters in the fusion processes. This is because any optimization of these parameters might change the fusion process completely. The typical parameter in Ericsson FSU995 splicers is the index limit.

(2) The models used for different fusion processes in the estimator might be completely different. For instance, in a normal splice, the contributions from the micro bending loss $L_D$ dominate the total splice losses. Therefore, the model calculations are based mainly on the $L_D$. On the other hand, however, if the core offset of two fibers is large, e.g. >1 μm, the splice losses will strongly depend not only on $L_D$ but also on the wavelength of the signal being transmitted. In this case, a new model for wavelength dependence losses has to be used for fully description of loss mechanisms. The typical example in Ericsson FSU 995 splicers is the estimation processes for the attenuator maker.

The Bellcore Criteria for Optimization

The basic objective of the off-line tuning is to optimize the estimation parameters so that any, or preferably the best, set of parameters fulfilled the Bellcore splice loss estimator accuracy criteria can be found. The Bellcore accuracy criteria is defined for 90% and 100% of splice populations, respectively, in Table 1:

TABLE 1

Bellcore Accuracy Criteria for Splice loss estimator

| | Estimating range | | | |
|---|---|---|---|---|
| | Requirement | | Objective | |
| Actual loss | 90% | 100% | 90% | 100% |
| ≤0.40 dB | ±0.10 dB | ±0.25 dB | ±0.05 dB | ±0.10 dB |
| >0.40 dB | ±25% | ±50% | ±15% | ±30% |

Based on the Bellcore criteria, the algorithms for evaluation of loss estimation can be derived. As an example, the Bellcore criteria used for the off-line tuning in Ericsson FSU995 splicer is given below:

$$L_{i,min}(L_{Mi}) \leq L_{Ti}(P_1, P_2, P_3, P_4, P_5, P_6, C_{i1}, C_{i2}, C_{i3})$$
$$\leq L_{i,max}(L_{Mi}); i=1, 2, \ldots, n \quad (6)$$

where $P_1$, $P_2$, $P_3$, $P_4$, $P_5$, $P_6$ are the estimation parameters (i.e. MFDL, MFDR, loss factor, index limit, macro factor and the $L_S$) for a given fusion process and given kind of fiber. Similarly, $C_{i1}$, $C_{i2}$, $C_{i3}$ are the analyzed results (i.e. $L_D$, V, and the view angle offset).

For the i'th splice, $C_{ik}$ (k=1,2,3) are given (i.e. derived from hot an cold images, respectively), whereas $L_{Ti}$ can be varied by selecting suitable set of $P_j$ (j=1,2 . . . 6). The tunable range of $L_{Ti}$ can be controlled by criteria parameters $L_{i,max}(L_{Mi})$ and $L_{i,min}(L_{Mi})$. For simplicity, we assume, here, that the maximum splice loss is 2.0 dB. Thus, the criteria for the i'th splice are given by the following relations.

For 90% of splice population:

$$L_{i,max}(L_{Mi}) = L_{Mi} + 0.10 \quad \text{if } L_{Mi} \leq 0.4 \text{ dB} \quad (7)$$
$$L_{Mi} + 0.25 \, L_{Mi} \quad \text{if } 0.4 < L_{Mi} \leq 2.0 \text{ dB}$$

$$L_{i,min}(L_{Mi}) = L_{Mi} - 0.10 \quad \text{if } L_{Mi} \leq 0.4 \text{ dB} \quad (8)$$
$$L_{Mi} - 0.25 \, L_{Mi} \quad \text{if } 0.4 < L_{Mi} \leq 2.0 \text{ dB}$$

For 100% of splice population:

$$L_{i,max}(L_{Mi}) = L_{Mi} + 0.25 \quad \text{if } L_{Mi} \leq 0.4 \text{ dB} \quad (9)$$
$$L_{Mi} + 0.50 \, L_{Mi} \quad \text{if } 0.4 < L_{Mi} \leq 2.0 \text{ dB}$$

$$L_{i,min}(L_{Mi}) = L_{Mi} - 0.25 \quad \text{if } L_{Mi} \leq 0.4 \text{ dB} \quad (10)$$
$$L_{Mi} - 0.50 \, L_{Mi} \quad \text{if } 0.4 < L_{Mi} \leq 2.0 \text{ dB}$$

In principle, the estimation parameters could be optimized by continuously varying all parameters $P_j$ with well-defined optimization routines and simultaneously calculating $L_{Ti}$ with formulas (1)–(4) until the Bellcore criteria, i.e. formula (6), is fulfilled for all splices.

Figure 3:
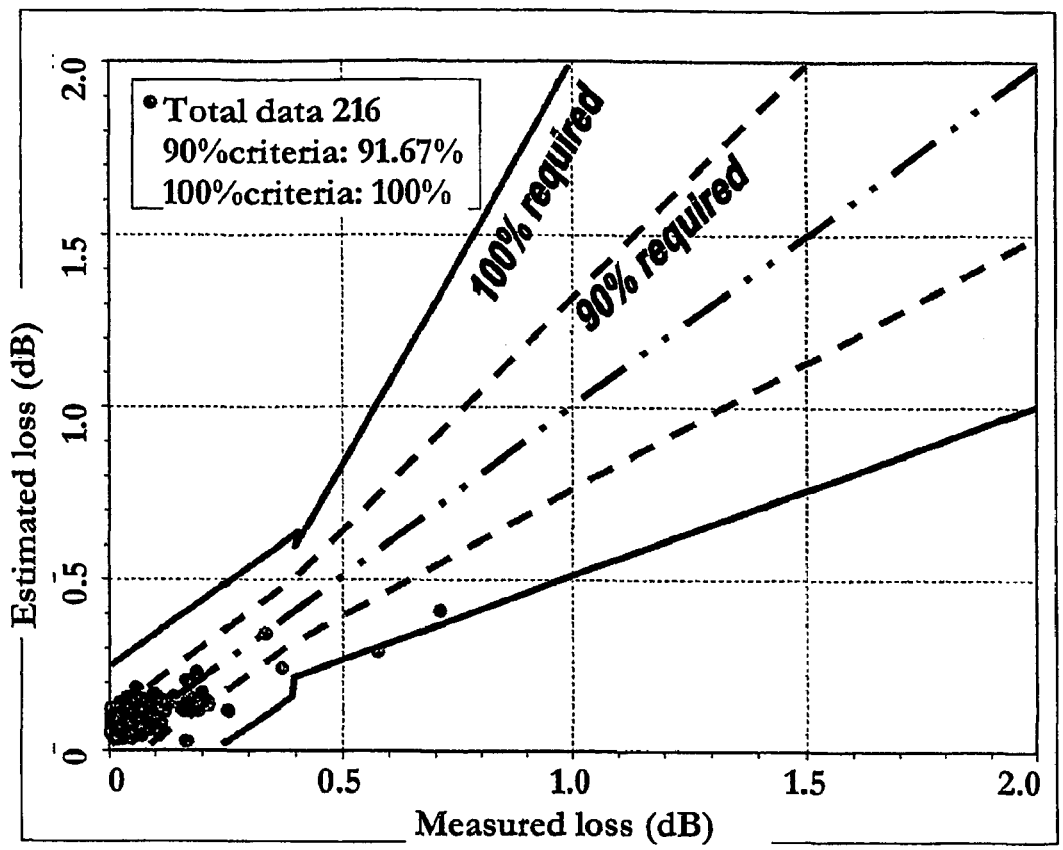
FIG. 3 illustrates the result of a splice loss estimation procedure, where the Bellcore criteria are fulfilled, which estimation procedure uses a new set of splice loss estimation parameters resulting from the automatic optimization according to the present invention.

FIG. 3 shows a typical example of the optimized data that fulfills the Bellcore requirement. The areas within dashed lines and solid lines, respectively, represent the 90% and the 100% Bellcore criteria, respectively. In this particular case, both 90% and 100% Bellcore criteria are completely fulfilled.

Regression Analysis Criteria for the Best Solution

It can be noticed that a set of optimized parameters that fulfill the Bellcore criteria is not unique. Different set of optimized parameters that fulfill the Bellcore criteria may be quite different, depending on optimization routines and parameter combinations being used for optimization. Though, even if any solution that fulfills the Bellcore criteria should be considered as an acceptable solution, it is still an open question whether it is interesting to select the best solution within Bellcore criteria.

The best solution could be defined as the set of parameters that maximize the probability that the estimated slice loss data represent the measured splice loss data, i.e. the data distribution in FIG. 3 should be optimized to be as closed to the diagonal line (dash-doted line in FIG. 3) as possible.

In order to search for the best solution, the method of regression analysis is used. Using such method, a regression line is generated by the "least-square fitting method" to give the best fit for the data set $\{L_{Mi}, L_{Ti}(P_j, C_{ik})\}$. The regression line can be expressed by:

$$L_T = aL_M + b \quad (11)$$

where:

$$a = \frac{n\left(\sum_{i=1}^{n} L_{Mi}L_{Ti}\right) - \left(\sum_{i=1}^{n} L_{Mi}\right)\left(\sum_{i=1}^{n} L_{Ti}\right)}{n\left\{\sum_{i=1}^{n} (L_{Mi}^2)\right\} - \left(\sum_{i=1}^{n} L_{Mi}\right)^2} \quad (12)$$

and $$b = \frac{\left(\sum_{i=1}^{n} L_{Ti}\right)\left\{\sum_{i=1}^{n} (L_{Mi}^2)\right\} - \left(\sum_{i=1}^{n} L_{Mi}\right)\left(\sum_{i=1}^{n} L_{Mi}L_{Ti}\right)}{n\left\{\sum_{i=1}^{n} (L_{Mi}^2)\right\} - \left(\sum_{i=1}^{n} L_{Mi}\right)^2} \quad (13)$$

Thus, the criteria for the best solution is the data set that not only fulfill the Bellcore criteria but the regression analysis criteria as well. The regression analysis criteria is given by $$|a-1| \leq \epsilon_1, |b| \leq \epsilon_2 \quad (14)$$

where, a and b are the slope and the interception of the regression line. $\epsilon_1$ and $\epsilon_2$ are the infinitesimal constants that set the conditions for controlling and terminating the optimization procedures.

In practice, however, additional criteria have to be taken into consideration, e.g. computing time restraints. Since many factors (e.g. hot spots, arc sparks) can not be completely handled by the estimator, it might not be possible to optimize the estimation parameters so that the data set completely fulfill the Bellcore criteria within finite computing time. Therefore, the criteria with well-defined computing loops and/or computing time have to be employed to terminate optimization processes if necessary.

Figure 4:
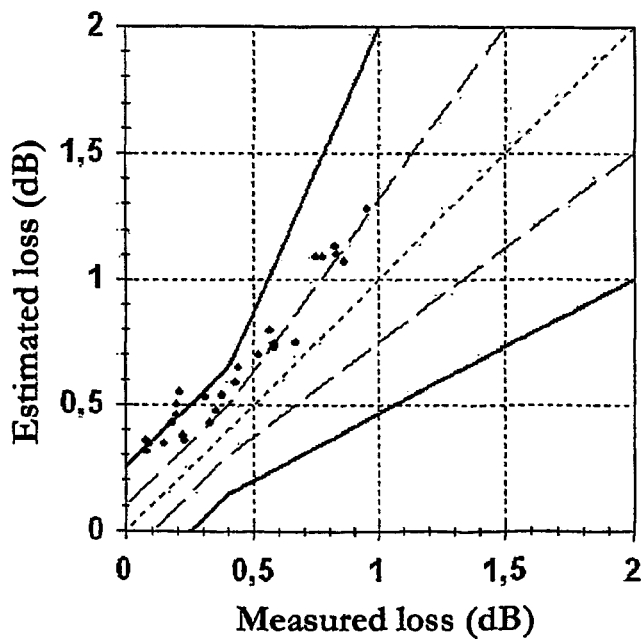
FIGS. 4–6 illustrate the results of splice loss estimation procedures using the original set of estimation parameters (FIG. 4); and new sets of splice loss estimation parameters resulting from the automatic optimization according to the present invention (FIGS. 5–6), respectively.
Figure 5:
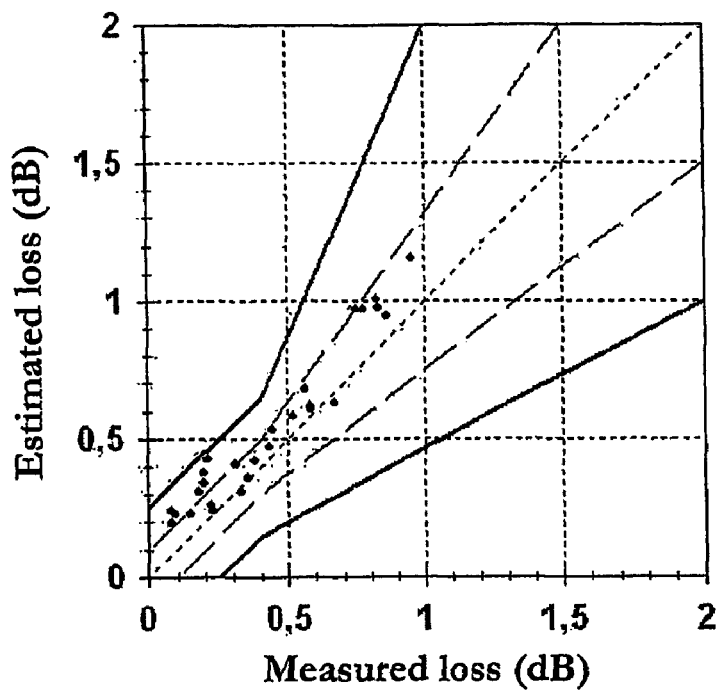
Figure 6:
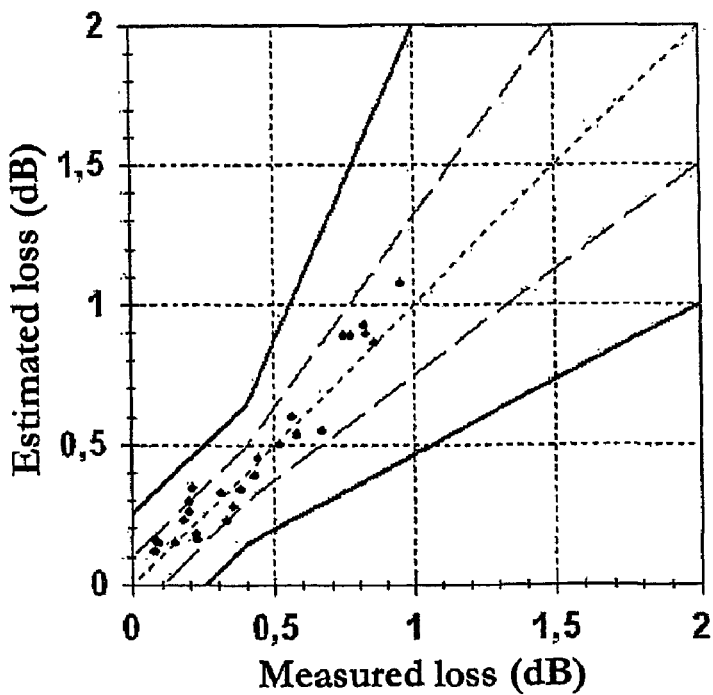

In FIGS. 4–6, the concept of the above-described two-step optimization is demonstrated. FIG. 4 shows the original data set that are uploaded without any optimization. FIG. 5 shows that the first step of optimization that fulfills the Bellcore criteria. In the second step of optimization, shown in FIG. 6, the best solution is found by use of regression analysis criteria.

Program Flowing Chart

Figure 7:
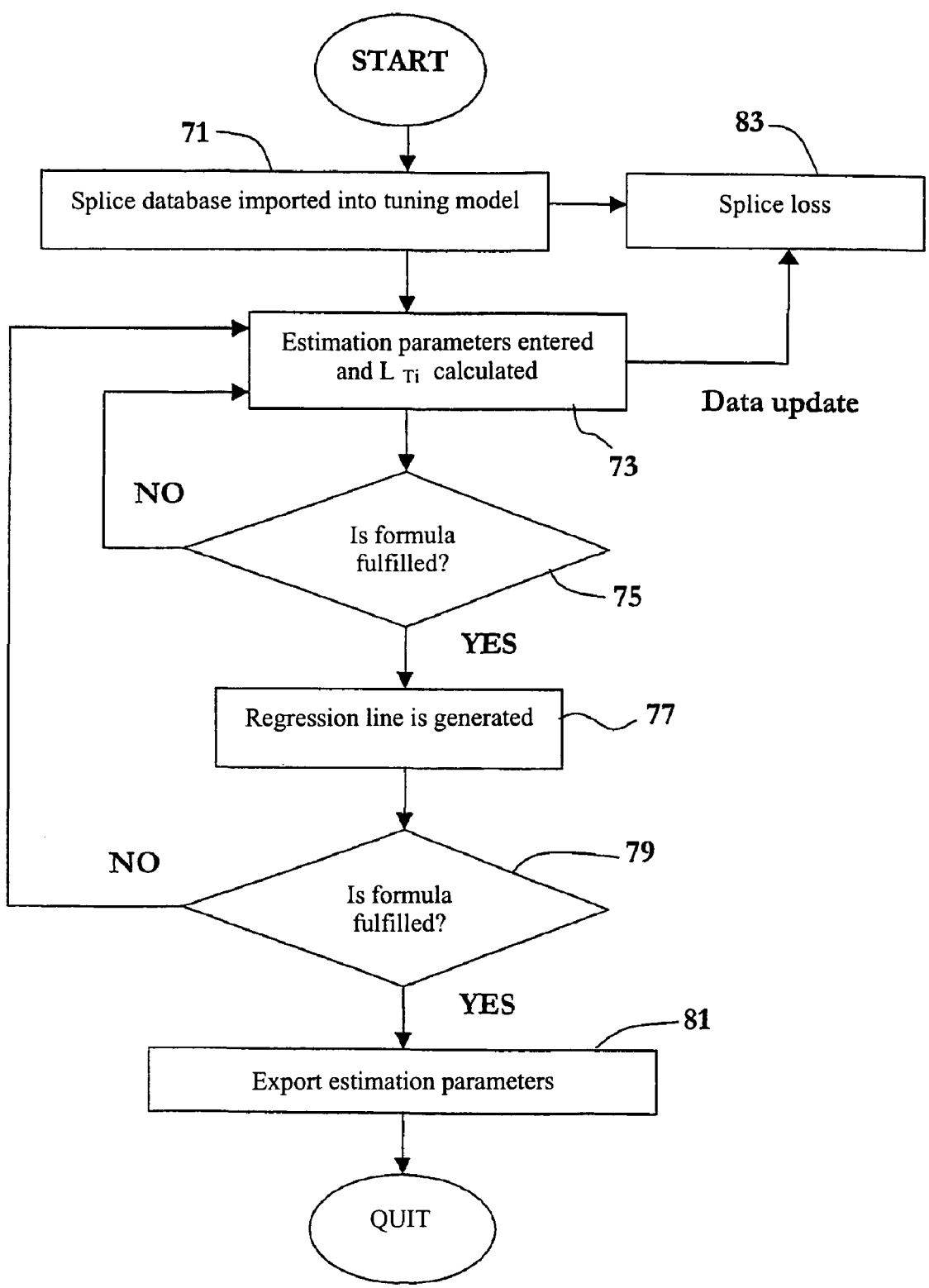
FIG. 7 is a schematic flow chart illustrating an off-line tuning procedure according to a preferred embodiment of the present invention.

Based on the basic concepts and techniques discussed above, a simplified program flowing chart used for the off-line tuning in the Ericsson FSU995 splicer is given in FIG. 7.

A splice database $\{L_{Mi}, L_{Ti}(P_j, C_{ik})\}$ is in a step 71 (which may indeed include a plurality of sub-steps) imported into the offline tuning model 21 of the apparatus 5 as shown in FIG. 1.

Then, in a step 73, the estimation parameters $P_j$ are altered and W is calculated by using formulas (1)–(4).

In a step 75 it is checked whether $L_{Ti}$ fulfills formula (6) and if not formula (6) is fulfilled the algorithm is returned to step 73. If formula (6) is fulfilled, then in a step 77 a regression line $L_T = aL_M + b$ is generated.

Then, in a step 79, it is checked whether formula 14 is fulfilled and if not formula (14) is fulfilled the algorithm is returned to step 73. If formula (14) is fulfilled, the estimation parameters are exported, in a step 81, to the download module 17 of FIG. 1, whereafter the algorithm is ended.

Optionally, in a step 83 a splice loss diagram is created similar to those shown in FIGS. 3 and 5–6.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. An apparatus for automatic optimization of a splice loss estimator of an optical fiber splicer apparatus, said splice loss estimator being adapted, in a splice loss estimation procedure, to estimate the splice losses ($L_{Ti}$) of splices (i) of end portions of optical fibers as produced by said fiber splicer apparatus from at least one respective image taken of the respective end portions of the optical fibers prior to, during, or subsequent to the splicing thereof, said splice loss estimation procedure including the use of a set of splice loss estimation parameters ($P_j$), comprising a first input line for receiving, from said splice loss estimator, data of a plurality of splices of end portions of optical fibers as produced by said fiber splicer apparatus, wherein said data for each splice (i) include information ($C_{ij}$) derived from the at least one image taken of the end portions of the optical fibers constituting that splice, and the estimated splice loss ($L_{Ti}$) of that splice;

a second input line for receiving a splice loss value ($L_{Mi}$) for each of said plurality of splices of end portions of optical fibers as measured by a measurement equipment;

means for determining a new set of splice loss estimation parameters from said data and said estimated and measured splice loss values such that said splice loss estimation procedure, using the new set of splice loss estimation parameters, estimates the splice loss of each of said plurality of splices of end portions of optical fibers with a given accuracy; and an output line for outputting said determined new set of splice loss estimation parameters to said splice loss estimator to replace the set of splice loss estimation parameters used in the splice loss estimation procedure of the splice loss estimator for the estimation of the splice losses of any further splices of end portions of optical fibers to be produced by said fiber splicer apparatus.

2. The apparatus as claimed in claim 1 wherein said data for each splice (i) include information ($C_{ij}$) derived from hot images taken of the end portions of the optical fibers constituting that splice.

3. The apparatus as claimed in claim 2 wherein said data for each splice include information regarding mismatch of mode field diameter (MFD), including micro bending loss ($L_D$), or fiber core/cladding deformation including cladding-to-core eccentricities, non-circularity of fibers, cleave angle of fiber ends, and/or cladding/core offsets.

4. The apparatus as claimed in claim 2 wherein said data for each splice include information regarding mismatch of hot core index ($L_I$), including hot core index offset (V), fiber dopant concentrations, and/or fiber core diameters.

5. The apparatus as claimed in claim 1 wherein said data for each splice (i) include information ($C_{ij}$) derived from cold images taken of the end portions of the optical fibers constituting that splice.

6. The apparatus as claimed in claim 5 wherein said data for each splice include information regarding macro bending, including view angle offset, fiber alignment, and/or presence of microdust on fiber surfaces.

7. The apparatus as claimed in claim 1 wherein said apparatus is a computer, preferably an off-line computer and/or a PC-platform based splicer, provided with suitable software and information as regards the splice loss estimation procedure used in the splice loss estimator.

8. The apparatus as claimed in claim 1 wherein said set of splice loss estimation parameters include any of an M factor, an F factor, a loss factor, a macro factor, a mode field diameter left ($MFD_L$) factor, a mode field diameter right ($MFD_R$) factor, and a splice loss shift ($L_S$) factor, where the M and F factors are employed in the estimation of a core deformation induced splice loss ($L_M$), the loss factor is employed in the estimation of a hot core index mismatch induced splice loss ($L_I$) the macro factor, the mode field diameter left ($MFD_L$) and right ($MFD_R$) factors are employed in the estimation of a macro bending induced splice loss ($L_A$) and the splice loss shift ($L_S$) factor is employed in the estimation of a splice loss correction term, which corrects for any systematic errors in the estimation procedure.

9. The apparatus as claimed in claim 1 wherein said apparatus is adapted to receive, on said first input line, the set of estimation parameters as used by said splicer apparatus.

10. The apparatus as claimed in claim 1 wherein
said apparatus is adapted to receive, on said first input line, a set of image processing parameters, wherein said set of image processing parameters are used in said splice loss estimation procedure by said splice loss estimator of the splicer apparatus;
said means for determining is adapted to determine a new set of image processing parameters from said data and said estimated and measured splice loss values such that said splice loss estimation procedure, using the new set of image processing parameters, estimates the splice loss of each of said plurality of splices of end portions of optical fibers with a given accuracy; and
said apparatus for automatic optimization is adapted to output, via said output line, said determined new set of image processing parameters to said splice estimator to replace the set of image processing parameters used in the splice loss estimation procedure of the splice estimator for the estimation of the splice losses of any further splices of end portions of optical fibers to be produced by said fiber splicer apparatus.

11. The apparatus as claimed in claim 1 wherein said plurality of splices are at least 50, more preferably at least 100, and most preferably between 100 and 500.

12. The apparatus as claimed in claim 1 wherein said means for determining is adapted to determine said new set of splice loss estimation parameters such that said new set of splice loss estimation parameters fulfils the Bellcore splice loss estimator criteria, preferably the 90% Bellcore criteria, and most preferably the 100% Bellcore criteria.

13. The apparatus as claimed in claim 1 wherein said means for determining is adapted to determine said new set of splice loss estimation parameters by using linear regression criteria to increase the probability that the estimated splice loss values using said new set of estimation parameters represent the measured splice losses.

14. A method for automatic optimization of a splice loss estimator of an optical fiber splicer apparatus, where said splice loss estimator is adapted, in a splice loss estimation procedure, to estimate the splice losses ($L_{Ti}$) of splices (i) of end portions of optical fibers as produced by said fiber splicer apparatus from at least one respective image taken of the respective end portions of the optical fibers prior to, during, or subsequent to the splicing thereof, said splice loss estimation procedure including the use of a set of splice loss estimation parameters ($P_j$), comprising the steps of:
receiving, from said splice loss estimator, data of a plurality of splices of end portions of optical fibers as produced by said fiber splicer apparatus, wherein said data for each splice (i) include information ($C_{ij}$) derived from the at least one image taken of the end portions of the optical fibers constituting that splice, and the estimated splice loss ($L_{Ti}$) of that splice;
receiving a splice loss value ($L_{Mi}$) for each of said plurality of splices of end portions of optical fibers as measured by a measurement equipment;
determining a new set of splice loss estimation parameters from said data and said estimated and measured splice loss values such that said splice loss estimation procedure, using the new set of splice loss estimation parameters, estimates the splice loss of each of said plurality of splices of end portions of optical fibers with a given accuracy; and
outputting said determined new set of splice loss estimation parameters to said splice loss estimator to replace the set of splice loss estimation parameters used in the splice loss estimation procedure of the splice loss estimator for the estimation of the splice losses of any further splices of end portions of optical fibers to be produced by said fiber splicer apparatus.

15. The method as claimed in claim 14 wherein said data for each splice (i) include information ($C_{ij}$) derived from hot images taken of the end portions of the optical fibers constituting that splice.

16. The method as claimed in claim 14 wherein said data for each splice (i) include information ($C_{ij}$) derived from cold images taken of the end portions of the optical fibers constituting that splice.

17. The method as claimed in claim 14 wherein said set of splice loss estimation parameters include any of an M factor, an F factor, a loss factor, a macro factor, a mode field diameter left ($MED_L$) factor, a mode field diameter right ($MFD_R$) factor, and a splice loss shift ($L_s$) factor, where the M and F factors are employed in the estimation of a core deformation induced splice loss ($L_M$), the loss factor is employed in the estimation of a hot core index mismatch induced splice loss ($L_I$) the macro factor, the mode field diameter left ($MFD_L$) and right ($MFD_R$) factors are employed in the estimation of a macro bending, induced splice loss ($L_A$) and the splice loss shift ($L_s$) factor is employed in the estimation of a splice loss correction term, which corrects for any systematic errors in the estimation procedure.

18. The method as claimed in claim 14 further comprising the steps of:
receiving, from said splice estimator, a set of image processing parameters, wherein said set of image processing parameters are used in said splice loss estimation procedure by said splice loss estimator of the splicer apparatus;
determining a new set of image processing parameters from said data and said estimated and measured splice loss values such that said splice loss estimation procedure, using the new set of image processing parameters, estimates the splice loss of each of said plurality of splices of end portions of optical fibers with a given accuracy; and
outputting said determined new set of image processing parameters to said splice estimator to replace the set of image processing parameters used in the splice loss estimation procedure of the splice estimator for the estimation of the splice losses of any further splices of end portions of optical fibers to be produced by said fiber splicer apparatus.

19. The method as claimed in claim 14 wherein said new set of splice loss estimation parameters is determined such that said new set of splice loss estimation parameters fulfils the Bellcore splice loss estimator criteria, preferably the 90% Bellcore criteria, and most preferably the 100% Bellcore criteria.

20. The method as claimed in claim 14 wherein said new set of splice loss estimation parameters is determined by using linear regression criteria to increase the probability that the estimated splice loss values using said new set of estimation parameters represent the measured splice losses.

21. A method for automatic optimization of a splice loss estimator of an optical fiber splicer apparatus, where said splice loss estimator is adapted, in a splice loss estimation procedure, to estimate the splice losses ($L_{Ti}$) of splices of end portions of optical fibers as produced by said fiber splicer apparatus from at least one respective image taken of the respective end portions of the optical fibers prior to, during, or subsequent to the splicing thereof, said splice loss estimation procedure including the use of a set of splice loss estimation parameters ($P_j$), comprising the steps of:

producing a plurality of splices of end portions of optical fibers by means of said fiber splicer apparatus;

deducing information from the at least one image taken for each splice produced;

estimating the splice loss based on the information deduced from the at least one image for each splice produced;

measuring the splice loss of each splice produced by means of a measurement instrument;

uploading the deduced information, the estimated splice losses and the measure splice losses to a processing device;

determining a new set of splice loss estimation parameters from the deduced information and the estimated and measured splice loss values such that said splice loss estimation procedure, using the new set of splice loss estimation parameters, estimates the splice loss of each of said plurality of splices of end portions of optical fibers with a given accuracy; and downloading said determined new set of splice loss estimation parameters to said splice loss estimator of the fiber splicer apparatus to replace the set of splice loss estimation parameters used in the splice loss estimation procedure of the splice loss estimator for the estimation of the splice losses of any further splices of end portions of optical fibers to be produced by said fiber splicer apparatus.

* * * * *

UNITED STATES PATENT AND TRADEMARK OFFICE
CERTIFICATE OF CORRECTION

PATENT NO. : 7,131,771 B2 Page 1 of 1
APPLICATION NO. : 10/473766
DATED : November 7, 2006
INVENTOR(S) : Huang et al.

It is certified that error appears in the above-identified patent and that said Letters Patent is hereby corrected as shown below:

In Column 6, Line 21, in Equation No. 2, delete "i" before "$L_M = L_M$…".

Signed and Sealed this

Eleventh Day of December, 2007

JON W. DUDAS
*Director of the United States Patent and Trademark Office*